US007211768B2

(12) United States Patent
Yamashita et al.

(10) Patent No.: US 7,211,768 B2
(45) Date of Patent: May 1, 2007

(54) HEATING LINE PATTERN STRUCTURE OF DEFOGGER

(75) Inventors: Hiromichi Yamashita, Minato-ku (JP); Kazuhisa Ono, Minato-ku (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 11/253,387

(22) Filed: Oct. 19, 2005

(65) Prior Publication Data

US 2006/0086714 A1 Apr. 27, 2006

(30) Foreign Application Priority Data

Oct. 19, 2004 (JP) ............................ 2004-304854

(51) Int. Cl.
*B60L 1/02* (2006.01)

(52) U.S. Cl. ....................... 219/203; 343/704; 343/714

(58) Field of Classification Search ................ 219/203, 219/522, 201, 202; 343/704, 714
See application file for complete search history.

(56) References Cited

U.S. PATENT DOCUMENTS 3,792,232 A * 2/1974 Zarenko ..................... 219/522
4,095,228 A * 6/1978 Meinke et al. .............. 343/704
4,791,426 A * 12/1988 Lindenmeier et al. ...... 343/713
5,097,270 A * 3/1992 Lindenmeier et al. ...... 343/704
5,334,988 A * 8/1994 Murakami et al. .......... 343/704
5,428,830 A * 6/1995 Zerod et al. ................ 455/282
5,610,619 A * 3/1997 Zafar ......................... 343/713
5,650,791 A * 7/1997 Talty .......................... 343/713
5,801,663 A * 9/1998 Lindenmeier et al. ...... 343/704
5,905,468 A * 5/1999 Ikawa et al. ................ 343/713
6,011,244 A * 1/2000 Castle et al. ................ 219/522
6,147,654 A * 11/2000 Nagy .......................... 343/713
6,163,303 A * 12/2000 Nagy .......................... 343/713

* cited by examiner

*Primary Examiner*—Robin Evans
*Assistant Examiner*—Vinod Patel
(74) *Attorney, Agent, or Firm*—RatnerPrestia

(57) ABSTRACT

A heating line pattern structure of a defogger comprising a meander shape heating line portion is provided, in which the local temperature rise of a glass panel may be suppressed and which has a good outward appearance. Two lateral heating lines each having a thick width are provided under the meander shape heating line portion. Tow lateral heating lines are connected to each lateral heating line under the meander shape heating line portion through a vertical heating line.

8 Claims, 5 Drawing Sheets

HEATING LINE PATTERN STRUCTURE OF DEFOGGER

BACKGROUND OF THE INVENTION

1. Field of the Invention

The present invention relates to a structure of a defogger formed on a window glass panel of a motor vehicle, particularly to a heating line pattern structure of a defogger formed on a window glass panel on which an antenna is provided 2. Related Art When a TV (television) antenna, particularly a digital TV antenna for 470~710 MHz band is provided on a rear window glass panel on which a defogger comprising a plurality of heating lines arranged between two bus-bars is formed, a problem is caused such that the control for the directivity of an antenna to a target electric wave becomes difficult due to an effect by the heating lines of the defogger. This is due to the fact that the directivity of an antenna on the rear window glass panel is varied in a vertical direction as shown in FIG. 1 by the dotted line 8 to decrease the sensitivity of the antenna in a horizontal direction.

In order to resolve such a problem, the applicant of the present application has proposed that a part of heating line of a defogger opposed to an antenna is patterned as a meander shape in Japanese Patent Publication No. 2002-8081.

FIG. 2 shows a heating line pattern having a meander shape proposed in the above-described publication. In the figure, the heating line pattern is symmetrical in right and left, so that the left end portion of the pattern is only shown for the simplicity of the drawing.

A monopole antenna 16 for a digital TV is provided between a defogger 12 on a rear window glass panel 10 of a motor vehicle and a roof 14 of a vehicle body, and on a side portion neighbored to a pillar 17. Reference numeral 18 designates a feeding point of the monopole antenna 16. The defogger 12 and monopole antenna 16 are made with silver print lines that are formed by printing a silver paste and then firing the paste.

The defogger 12 is structured by bus-bars 20 on both side portion and a plurality of heating lines arranged between the bus-bars 20. A part of the upper most heating line 12-1 neighbored to the monopole antenna 16 has a meander shape. The heating line is meandered in a rectangular manner at regular intervals to form a meander shape heating line portion 22.

Under the meander shape heating line portion 22, one lateral heating line 13 is extended and connected to a vertical heating line 15. Four lateral heating lines 12-2, 12-3, 12-4 and 12-5 are commonly connected to the vertical heating lines 15. The lateral heating line 13 under the meander shape heating line portion 22 is on the same horizontal position as the heating line 12-5. A plurality of heating lines under the heating line 12-5 are normal linear heating lines 12-6 extending between the bus-bars 20.

In order to increase the defogging effect of the heating lines of the defogger 12, a meander shape structure is generally adopted for the heating lines. For example, Japanese Utility Model Publication No. 1990-139161 disclosed that a heating line is formed in a zigzag manner, the pitch of zigzagged line being made small in a region required to be strongly heated.

However, the meander shape structure shown in FIG. 2 has been adopted to decrease the effect of the heating lines to an antenna provided neighbored to a defogger, so that the meander shape structure proposed by the present applicant is different in concept from that disclosed in the Utility Model Publication.

In the heating line pattern of the defogger shown in FIG. 2, the currents through the four heating lines 12-2, 12-3, 12-4 and 12-5 flows into the heating lines 13 and 15 under the meander shape heating line portion 22, so that the width of respective heating lines 13 and 15 is selected to be three-four times that of a normal heating line to suppress the increasing of heating due to the lines 13 and 15. In this case, the width of respective heating lines 13 and 15 is too thick, so that the heating lines have a poor-looking.

SUMMARY OF THE INVENTION

An object of the present invention is to provide a heating line pattern structure of a defogger having no too thick heating lines and a poor-looking thereof.

Another object of the present invention is to provide a heating line pattern structure of a defogger for suppressing the local temperature rise of a glass panel.

One aspect of the present invention is a structure of a heating line pattern of a defogger formed on a rear window glass panel on which an antenna is provided in a space over the defogger, comprising a plurality of bus-bars formed on both sides of the rear window glass panel; and a plurality of lateral heating lines arranged between the bus-bars; wherein at least one heating line neighbored to the antenna has a meander shape; and one lateral heating line under the part of the meander shape of the heating line is connected to one heating line or two heating lines on the central portion of the rear window glass panel through a vertical heating line.

Another aspect of the present invention is a structure of a heating line pattern of a defogger formed on a rear window glass panel on which an antenna is provided in a space over the defogger, comprising a plurality bus-bars formed on both sides of the rear window glass panel; and a plurality of lateral heating lines arranged between the bus-bars; wherein at least one heating line neighbored to the antenna has a meander shape; and two or more lateral heating lines under the part of the meander shape of the heating line are connected to one or two heating lines on the central portion of the rear window glass panel through a vertical heating line, respectively.

It is preferable that the width of the lateral heating line under the part of the meander shape of the heating line portion of the rear window glass panel. If it is smaller than one time, the heating of a lateral heating line under the part of the meander shape of the heating line becomes high, so that the function of a defogger is not effective. If it is larger than 3 times, the width of a lateral heating line becomes thick, resulting in a poor-looking.

The width of a normal lateral heating line on the side portion of a rear window glass panel is smaller than 1 mm, i.e., 0.5–1 mm, so that the width of the lateral heating line under the part of the meander shape of the heating line is preferably 0.5–3 mm.

It is preferable that the resistance of the lateral heating line under the part of the meander shape of the heating line is 0.07–3.2Ω/dm. Herein, dm (decimeter) means 10 cm. If the resistance is larger than 3.2Ω/dm, the heating of the lateral heating line under the part of the meander shape of the heating line become high. This is not preferable, because a defogger is usually designed so that the central portion of a glass panel is defogged first, and subsequently the side portion thereof is defogged. If the resistance is smaller than 0.07Ω/dm, the heating of the lateral heating line under the part of the meander shape of the heating line become low. This leads to an insufficient defogging effect.

Another method for regulating the resistance of the heating line without broadening the width thereof is that the thickness of the lateral heating line under the part of the meander shape of the heating line is made thicker than that of a normal heating line. In this case, it is preferable that the thickness of the lateral heating line under the part of the meander shape of the heating line is 1–3 times that of a normal lateral heating line. The regulation for the thickness of the heating line may be carried out by regulating the mesh size of a screen in a screen printing process.

The calorific value per unit area generated by the lateral heating line under the part of the meander shape of the heating line is preferably 180–500 $W/m^2$. If it is smaller than 180 $W/m^2$, the defogging ability becomes poor in comparison with a normal heating line on the side portion of a rear window glass panel. If it is larger than 500 $W/m^2$, the maximum temperature of the lateral heating line under the part of the meander shape of the heating line becomes 70° C. or more, which is not preferable.

The calorific value per unit area generated by the lateral heating line under the part of the meander shape of the heating line is more preferably 200–350 $W/m^2$, because a defogger is usually designed so that the central portion of a glass panel is defogged first, and subsequently the side portion thereof is defogged.

It is also preferable that the interval between neighbored two lateral heating line under the part of the meander shape of the heating line is 12–40 mm. If it is smaller than 12 mm, the temperature of a glass panel is locally elevated. If it is larger than 40 mm, the temperature of a glass panel is not locally elevated, but a wiring becomes difficult due to the distance between the hating line portion having a meander shape and a normal heating line.

It is also preferable that when a predetermined voltage is applied across the bus-bars for 30 minutes at an ambient temperature of 25° C., the temperature of the lateral heating line under the part of the meander shape of the heating line is lower than 70° C., and the difference between the temperature of the lateral heating line under the part of the meander shape of the heating line and the temperature of a normal lateral heating line on the side portion of the rear window glass panel is lower than 15° C.

The reason why the temperature of the lateral heating line under the heating line portion having a meander shape is selected to be lower than 70° C. is based on the safety. And, the reason why the difference between the temperature of the lateral heating line under the part of the meander shape of the heating line and the temperature of a normal lateral heating line on the side portion of the rear window glass panel is selected to be lower than 15° C. is based on the recognition that a defogger is usually designed in such a manner that the central portion of a glass panel is defogged first, and subsequently the side portion thereof is defogged.

BEST MODE FOR CARRYING OUT THE INVENTION

An embodiment of the present invention will now be described with reference to the drawings.

Figure 3:
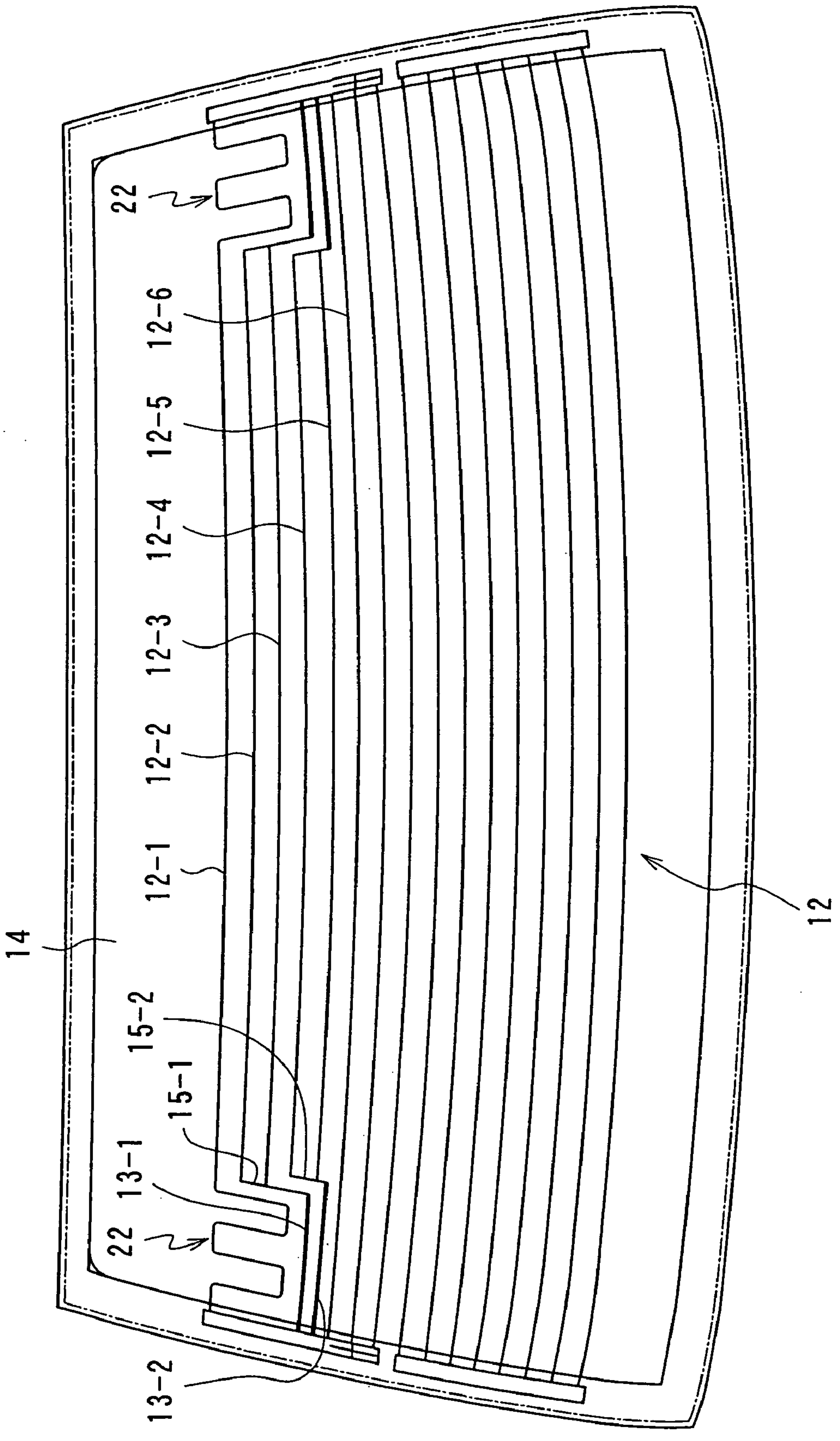
FIG. 3 shows an embodiment of a heating line pattern structure according to the present invention.

FIG. 3 shows an embodiment of a heating line pattern structure according to the present invention. In the figure, a total of a defogger 12 is illustrated.

Figure 1:
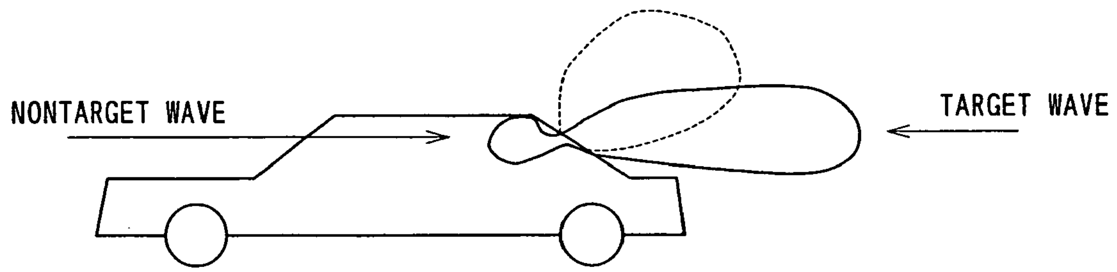
FIG. 1 shows the condition such that the directivity of an antenna on a rear window glass panel is varied in a vertical direction due to an effect by the heating lines of a defogger.
Figure 2:
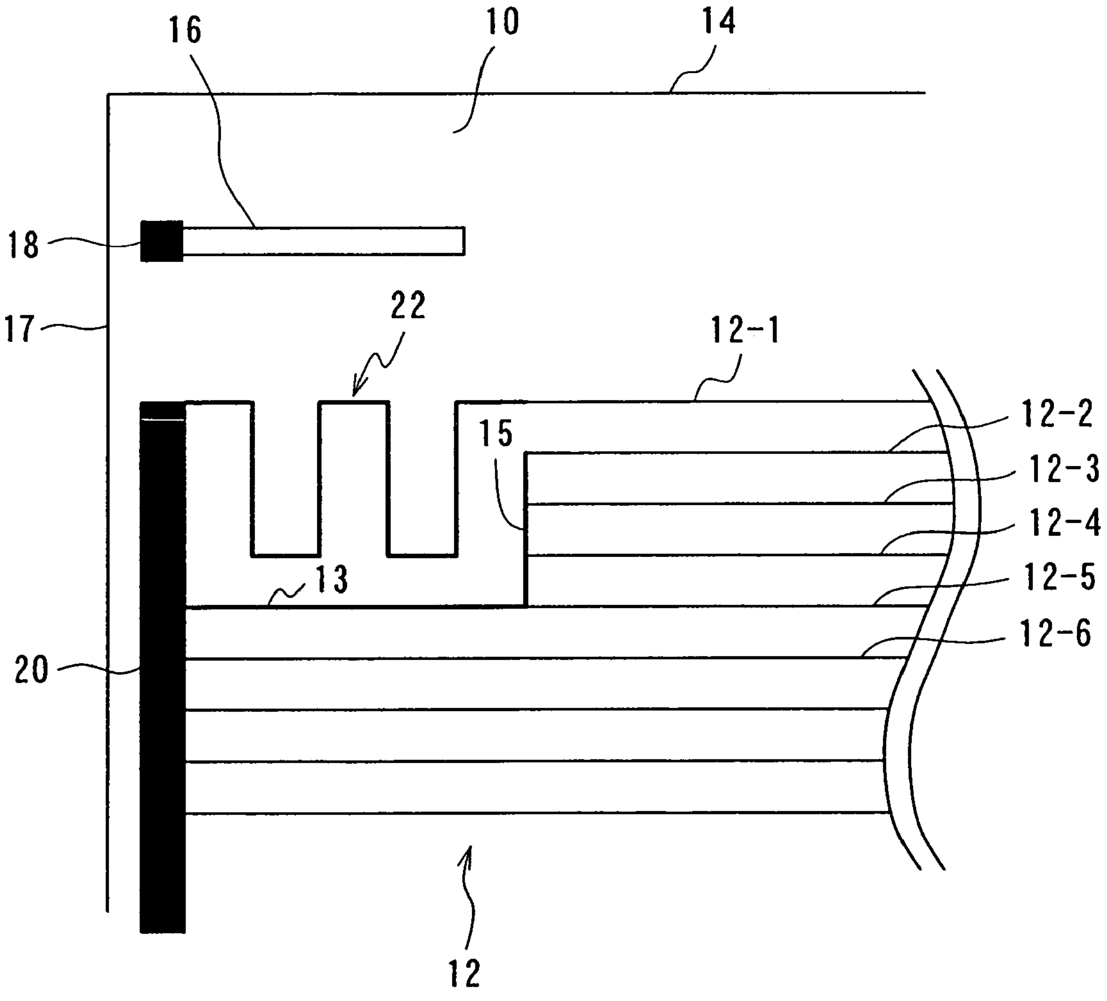
FIG. 2 shows the structure of a meander shape heating line portion.

According to the present embodiment, there are provided two lateral heating lines 13-1 and 13-2 under one meander shape heating line portion 22. On the contrary, one lateral heating line is provided under the meander shape heating line portion in FIG. 2.

Two lateral heating lines 12-2 and 12-3 are connected to the lateral heating line 13-1 through a vertical heating line 15-1, and two lateral heating lines 12-4 and 12-5 are connected to the lateral heating line 13-2 through a vertical heating line 15-2.

While the heating line pattern structure of the present embodiment has been illustrated with reference to FIG. 3, various requirements are necessitated in order to make the defogging of a rear window glass panel effective, for example (1) to suppress the load to a battery of a motor vehicle, (2) to effectively defog a particular area for securing a visual field, etc.

For the requirements (1) and (2), it is preferable that the central portion of a glass panel is defogged first, and subsequently the area surrounding the central portion is defogged.

In order to satisfy these requirement, the width of a heating line, the array pitch of the heating lines, etc., are determined by using a simulation method.

Figure 4:
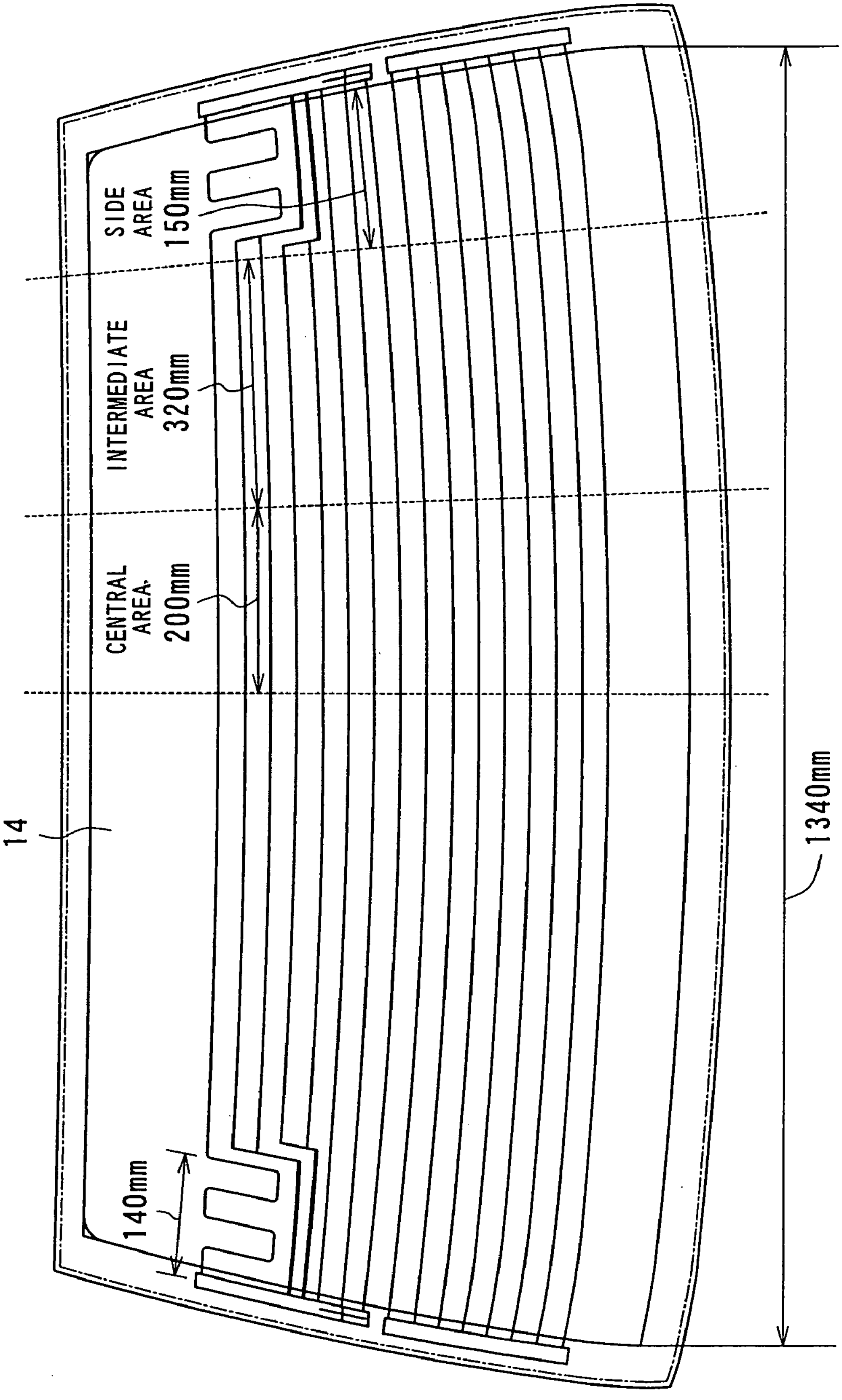
FIG. 4 shows the dimensions of the heating line pattern in FIG. 3.

FIG. 4 shows the dimensions of the heating line pattern in FIG. 3. The area of the rear window glass panel is divided into the central area, the intermediate areas next to the central area, and the side areas next to the respective intermediate areas. The central area is intended for high heating, the intermediate area for medium heating, and the side area for low heating. For this purpose, the width of heating line in respective areas is selected in such a manner that the heating line width in the side area>the heating line width in the intermediate area>the heating line width in the central area.

In the present embodiment, the heating line pattern (the thickness of the heating lines are substantially the same) shown in FIG. 3 is screen printed with a conductive paste on the surface of the rear window glass panel of 3.5 mm thick, and then is fired by the heat generated during the bending process of the glass panel to a predetermined shape.

The lateral length of the bottom portion of the defogger 12 is approximately 1340 mm, the lateral length of the central area approximately 200 mm, the lateral length of the intermediate area approximately 320 mm, and the lateral length of the side area approximately 150 mm.

The width of the normal lateral heating line in the central area is approximately 0.5 mm, the width of the normal lateral heating line in the intermediate area approximately 0.6–0.7 mm, and the width of the normal lateral heating line in the side area approximately 1.0 mm.

The interval between neighbored heating lines in a normal pattern structure is approximately 28 mm in the central, intermediate, and side areas.

The width of each of two lateral heating lines 13-1 and 13-2 under the meander shape heating line portion 22 and the width of each of two vertical heating lines 15-1 and 15-2 are approximately 2.5 mm, respectively. The interval between the heating lines 13-1 and 13-2 is approximately 18 mm.

The resistance of respective lateral heating lines 13-1 and 13-2 is approximately 0.18Ω/dm.

For the heating line pattern having dimensions described above, the heat distribution may be determined by a simulation method. The simulation is carried out by preparing (1) the thickness of a glass panel, (2) the heat conductivity of a glass panel, and (3) the calorific value by a heating line (the calorific value is determined by the resistance of a heating line and the voltage applied across the bus-bars). A predetermined voltage is applied across the bus-bars for 30 minutes at an ambient temperature of 25° C., and then the temperature on the surface of the glass panel is estimated. The predetermined temperature herein is an actual voltage applied across the bus-bars on the glass panel which is provided on a motor vehicle. While 12 volts is normally used for the predetermined temperature, 24 volts, 42 volts and so on may be used.

The temperature difference between the central area and the normal side area is approximately 20–25° C., the temperature of the central area being larger than that of the normal side area. The temperature difference between the intermediate area and the normal side area is approximately 15° C., the temperature of the intermediate area being larger than that of the normal side area. The maximum temperature of the lateral heating lines 13-1 and 13-2 under the meander shape heating line portion 22 is 54° C. smaller than 70° C. The temperature difference between the lateral heating lines 13-1 and 13-2 and the lateral heating line in the normal side area is 12° C. smaller than 15° C. Consequently, the fog on the glass panel may be cleared in the order of the central area, the intermediate area, the lateral heating lines under the meander shape heating line portion, and the heating lines in the normal side area.

According to the present embodiment, the heating line pattern structure may be realized in such a manner that the heating line pattern looks nice, the effective defogging function which suppress the local temperature rise of the glass panel is provided, and the calorific value per unit area of the lateral heating lines under the meander shape heating line portion is 260 W/m$^2$.

Figure 5:
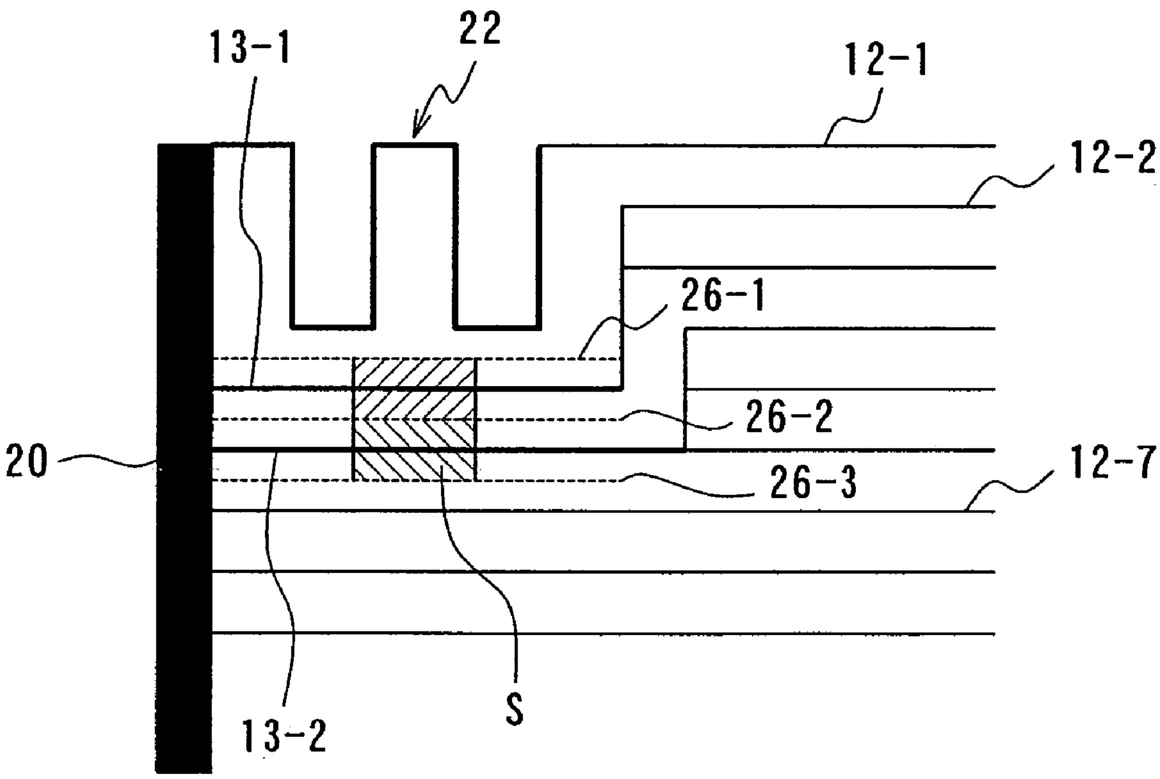
FIG. 5 shows a schematic diagram for explaining the concept of area in a calorific value.

The concept of area in a calorific value will be explained with reference to FIG. 5. In the figure, the center dotted line 26-2 is drawn between the bottom heating line of the meander shape heating portion 22 and the lateral heating line 13-1, the center dotted line 26-2 is drawn between the lateral heating lines 13-1 and 13-2, and the center dotted line 26-3 is drawn between the lateral heating line 13-2 and 12-7. The area in a calorific value is the region S between the center dotted lines shown in FIG. 5, the calorific value in the region S being converted into that per unit area.

In another example of the present embodiment, the interval between the lateral heating lines 13-1 and 13-2 under the meander shape heating line portion 22 is selected to be 10 mm. The maximum temperature of the lateral heating lines 13-1 and 13-2 is 66° C., and the temperature difference that maximum temperature and the normal lateral heating line is 22° C. The calorific value per unit area of the lateral heating lines 13-1 and 13-2 is 400 W/m$^2$. As a result, the heating line pattern structure may be realized in such a manner that the width of heating lines may be suppressed to have a good outward appearance in spite of local temperature rise of the lateral heating lines under the meander shape heating line portion.

According to a further example of the present embodiment, the interval between the lateral heating lines 13-1 and 13-2 is selected to be 14 mm. The maximum temperature of the lateral heating lines 13-1 and 13-2 is 57° C., and the difference that maximum temperature and the normal lateral heating line is 15° C. The calorific value per unit area of the lateral heating lines 13-1 and 13-2 is 325 W/m$^2$. Therefore, the heating line pattern structure may be realized in such a manner that the width of heating lines may be suppressed to have a good outward appearance in spite of local temperature rise of the lateral heating lines under the meander shape heating line portion.

When the length of respective lateral heating lines 13-1 and 13-2 each having thick width is a, and the length of respective lateral heating lines 12-2, 12-3, 12-4, and 12-5 which are connected t the lateral heating lines 13-1 and 13-2 is b, the ratio between the total length 2a of the lateral heating lines 13-1 and 13-2 and the total length (2a+b) of one heating line, i.e., 2a/(2a+b) is approximately 0.22, preferably 0.1–0.3.

Figure 6:
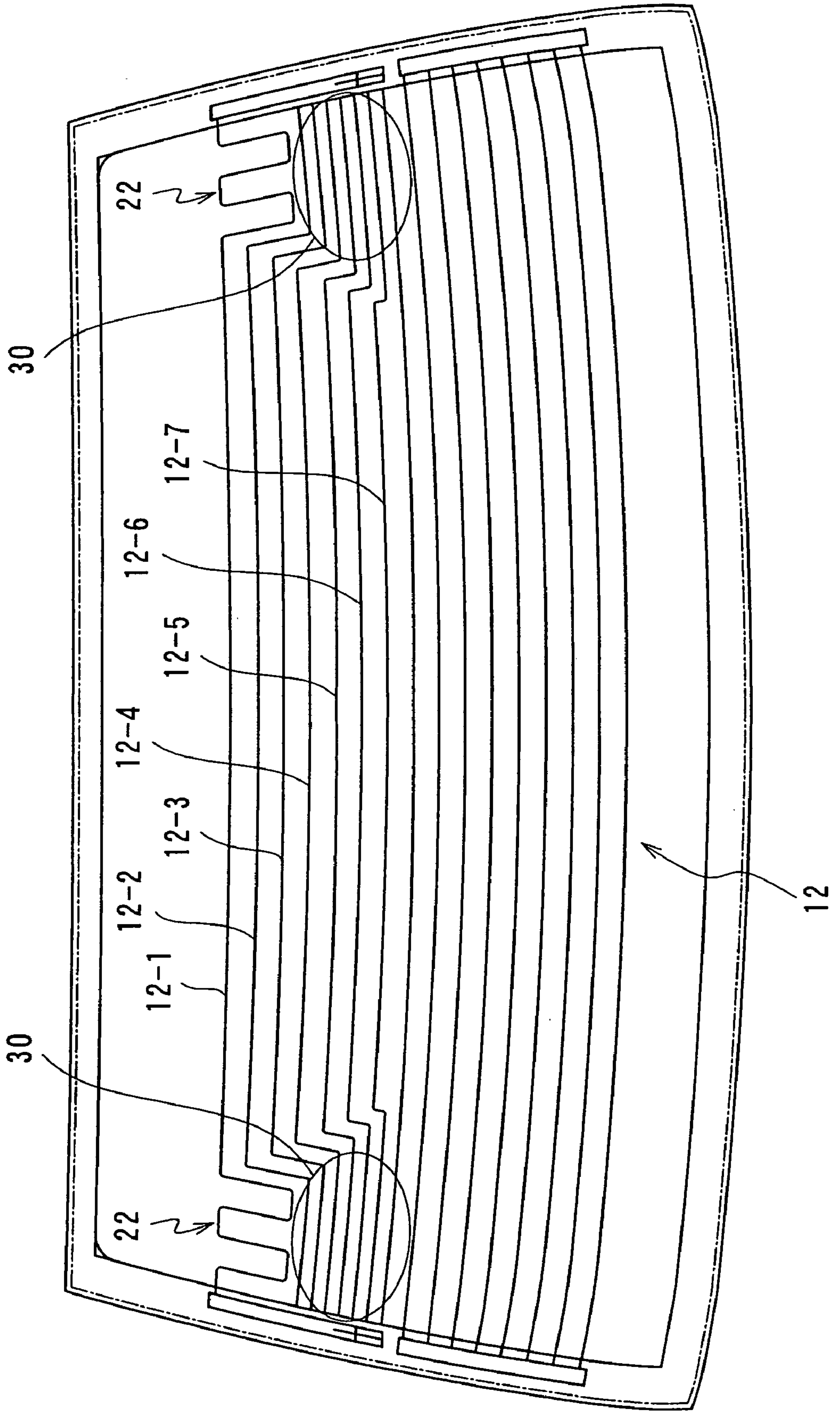
FIG. 6 shows another embodiments of the heating line pattern structure according to the present invention.

FIG. 6 shows another embodiment of the heating line pattern structure according to the present invention. A total of a defogger 12 is illustrated in the figure.

In the present embodiment, different from the embodiment in FIG. 3, each of six heating lines 12-2, 12-3, 12-4, 12-5, 12-6, and 12-7 is bent to be extended under the meander shape heating line portion 22. The part of the six heating lines extended under the meander shape heating line portion is designated by reference numeral 30 in FIG. 5. The heating lines in this part 30 are arranged at equal pitch, and the width of each heating line in this part is substantially 1.0 mm.

It is also recognized by means of a simulation method that the desired clearness of fog on the glass panel may be realized according to the heating line pattern structure of the present embodiment.

While the meander shape heating line portion is formed by a heating line bent in a rectangular manner in each embodiment described hereinbefore, the present invention is not limited thereto. It is possible, for examples that the bent corner of a heating line may be rounded, or a heating lines meandered in a sinusoidal manner.

While the respective thicknesses of heating lines are substantially the same in each embodiments described above, the present invention is not limited thereto. It is possible, for example, that the thickness of a lateral heating line under the meander shape heating line portion may be 1–3 times that of a normal lateral heating line to regulate a resistance thereof.

While the number of heating lines under the meander shape heating line portion is 2 or 6, the present invention is not limited thereto. One lateral heating lines may be selected in the case that the meander shape heating line portion is comparatively small.

As a method for thickening a lateral heating line formed with a conductive paste by means of a screen printing process, a screen in which mesh size is made large for the portion corresponding to the heating line to be thickened may be utilized.

The invention claimed is:

1. A structure of a heating line pattern of a defogger formed on a rear window glass panel on which an antenna is provided in a space next to the defogger, comprising:

a plurality of bus-bars formed on both sides of the rear window glass panel; and a plurality of lateral heating lines arranged between the bus-bars wherein:

the defogger and the antenna are provided in separate areas of the rear window glass panel;

at least one heating line next to the antenna has a meander shape; and one lateral heating line next to part of the meander shape of the heating line is connected to one further heating line or two further heating lines on a central portion of the rear window glass through a vertical heating line, exclusive of any other heating lines connected through the vertical heating line.

2. A structure of a heating line pattern of a defogger formed on a rear window glass panel on which an antenna is provided in a space next to the defogger, comprising:

a plurality of bus-bars formed on both sides of the rear window glass panel; and a plurality of lateral heating lines arranged between the bus-bars, wherein:

the defogger and the antenna are provided in separate areas of the rear window glass panel;

at least one heating line next to the antenna has a meander shape; and two or more lateral heating lines next to part of the meander shape of the heating line are each connected to one further heating line or two further heating lines on a central portion of the rear window glass panel through a vertical heating line, respectively, exclusive of any other heating lines connected through the vertical heating line.

3. The structure of a heating line pattern according to claim 1 or 2, wherein a width of the lateral heating line next to the part of the meander shape of the heating line is 1–3 times that of a normal lateral heating line on a side portion of the rear window glass panel.

4. The structure of a heating line pattern according to claim 1 or 2, wherein a width of the lateral heating line next to the part of the meander shape of the heating line is 0.5–3 mm.

5. The structure of a heating line pattern according to claim 1 or 2, wherein a thickness of the lateral heating line next to the part of the meander shape of the heating line is 1–3 times that of a normal lateral heating line on a side portion of the rear window glass panel.

6. The structure of a heating line pattern according to claim 1 or 2 wherein a resistance of the lateral heating line next to the part of the meander shape of the heating line is 0.07–3.2 Ω/dm.

7. The structure of a heating line pattern according to claim 1 or 2, wherein a calorific value per unit area by the lateral heating line next to the part of the meander shape of the heating line is 180–500 W/m$^2$.

8. The structure of a heating line pattern according to claim 1 or 2, wherein when a predetermined voltage is applied across the bus-bars for 30 minutes at an ambient temperature of 25° C., a temperature of the lateral heating line next to the part of the meander shape of the heating line is lower than 70° C., and a difference between the temperature of the lateral heating line next to the part of the meander shape of the heating line and a temperature of a normal lateral heating line on a side portion of the rear window glass panel is lower than 15° C.

* * * * *